(12) United States Patent
Moilanen

(10) Patent No.: US 7,658,555 B1
(45) Date of Patent: Feb. 9, 2010

(54) AERIAL VIDEO MOUNT

(76) Inventor: Joe A. Moilanen, 446 Moilanen Rd., Longview, WA (US) 98632

( * ) Notice: Subject to any disclaimer, the term of this patent is extended or adjusted under 35 U.S.C. 154(b) by 220 days.

(21) Appl. No.: 11/956,838

(22) Filed: Dec. 14, 2007

Related U.S. Application Data

(60) Provisional application No. 60/875,131, filed on Dec. 15, 2006.

(51) Int. Cl.
  *H04N 5/225* (2006.01)
  *G03B 17/00* (2006.01)
  *G01C 19/02* (2006.01)

(52) U.S. Cl. .................. 396/427; 396/428; 348/373; 74/5.34

(58) Field of Classification Search ............ 396/427
See application file for complete search history.

(56) References Cited

U.S. PATENT DOCUMENTS

| | | | |
|---|---|---|---|
| 2,506,095 A | 5/1950 | Mantz | 396/12 |
| 2,883,863 A | 4/1959 | Karsten | 74/5.22 |
| 3,044,346 A | 7/1962 | Fieux | 352/243 |
| 3,638,502 A | 2/1972 | Leavitt | 74/5.34 |
| 4,044,364 A | 8/1977 | Prinzo | 396/428 |
| 4,218,702 A | 8/1980 | Brocard | 348/144 |
| 4,669,843 A | 6/1987 | Bozzolato | 396/12 |
| 4,825,232 A | 4/1989 | Howdle | 396/12 |
| 5,184,521 A * | 2/1993 | Tyler | 74/5.34 |
| 5,231,435 A | 7/1993 | Blakely | 396/12 |
| 5,426,476 A | 6/1995 | Fussell | 396/12 |
| 5,531,403 A | 7/1996 | Tyler | |
| 5,765,043 A | 6/1998 | Tyler | 396/12 |
| 5,884,867 A | 3/1999 | Gordon | 244/152 |
| 5,995,758 A | 11/1999 | Tyler | 396/13 |
| 6,209,834 B1 | 4/2001 | Stonehouse | 248/274.1 |
| 6,424,804 B1 | 7/2002 | Johnson | 396/12 |
| 7,068,927 B2 | 6/2006 | Itzkowitz | 396/13 |
| 2006/0071134 A1 | 4/2006 | Dent et al. | 248/274.1 |

* cited by examiner

*Primary Examiner*—Melissa J Koval
(74) *Attorney, Agent, or Firm*—Bert P. Krages, II

(57) ABSTRACT

A stabilizing and vibration-isolating mount to facilitate the manual operation of a camera from mobile platforms such as aircraft, motor vehicles, and watercraft. The camera mount comprises a carriage assembly that allows the roll axis of rotation to pass through the optical axis of the camera lens, thus eliminating the pendulum or over-the-center phenomenon that characterizes moving images filmed while the camera is moving about the roll axis. Movement around all three axes of rotation can be stabilized by gyrostabilizers that can be adjustably positioned through the centerlines of the pan, roll, and tilt axes.

12 Claims, 9 Drawing Sheets

AERIAL VIDEO MOUNT

BACKGROUND OF THE INVENTION

The use of video and motion picture cameras in aircraft and other moving vehicles is well known in applications such as news coverage, movie production, and aerial reconnaissance. One of the recurring problems in photographing or filming from aircraft, motor vehicles, and watercraft is that the jostling and vibration of the camera can mar the visual quality of the images or footage. This problem is particularly difficult to resolve when filming from helicopters because of the very high level of vibration. Much of the video and motion picture photography that is done from aircraft uses mounts that are integrally attached to the aircraft and therefore require structural modification of the aircraft and certification by the Federal Aviation Administration. What is needed for many applications is a mount that stabilizes the camera and reduces the level of vibration transmitted by the aircraft, vehicle, or watercraft.

SUMMARY OF THE INVENTION

The present invention is a stabilizing and vibration-isolating mount to facilitate the manual operation of a camera from mobile platforms such as aircraft, motor vehicles, and watercraft. The mount comprises a carriage assembly comprising a carriage that rolls on top of a set of curved carriage rails. This assembly allows the roll axis of rotation to pass through the optical axis of the camera lens, thus eliminating the pendulum or over-the-center phenomenon that characterizes moving images filmed while the camera is moving about the roll axis. The mount permits rotation of the camera about the tilt axis by a pivotal bearing that is adjustably attached to the upper end of a yoke. The bottom of the yoke comprises a stud which passes through a bearing on a hub plate and thus allows the yoke to pivot around the pan axis. Movement about all three axes of rotation can be stabilized by gyrostabilizers that can be adjustably positioned through the center lines of the respective axes.

The mount utilizes vibration isolators mounted between the seat plate and another supporting plate. The isolators reduce the transmission of vibrations from the aircraft, vehicle, or watercraft to the rest of the mount. The reduction in the transmitted vibrations improves the quality of the images produced by the camera by largely eliminating the adverse effect caused by vibration. In addition, the reduction of transmitted vibration facilitates the operation of the camera by making it easier to observe the viewfinder or viewing screen of the camera, as well as reducing the impediment that high levels of vibration cause to the smooth movement of the camera.

Setting up and operating the mount is straightforward. The camera is attached to the camera base plate which is thereafter adjusted so that the optical axis of the lens is centered into alignment with the roll axis of the mount. This adjustment can be facilitated by a removable centering guide that temporarily placed into a slot adjacent to the carriage rails. Gyrostabilizers can be likewise attached to their respective base plates and adjusted so that they are properly centered and aligned with the appropriate axis of rotation. Further adjustments to the balance, center of gravity, and total height of the camera can be made by moving and securing weights at various places on the mount and by moving and securing adjustable rails and plates.

In the preferred embodiment, the mount comprises a seat base with latches that allows the mount to be secured and quickly removed from the seat boxes of certain kinds of aircraft. This renders the mount portable but also permits the mount to be securely affixed to an aircraft without having to obtain a supplemental type certification from the Federal Aviation Administration. Other modes of attachment, such with straps, clamps, and bolts can also be used to removably secure the mount to an aircraft, vehicle, or watercraft. Once the mount is attached, the operator can adjust pan stops if desired to limit the rotation about the pan axis so as to avoid filming extraneous visual elements such as the door frame of an aircraft.

Once the gyrostabilizers are activated and allowed to reach their operating rate of rotation, they exert a stabilizing effect along each axis of rotation and thus restrain the camera from jostling or other inadvertent motion. However, the camera operator can overcome the resistance to movement by smoothly directing the camera into the desired position. In the preferred embodiment, the carriage is fitted with grips that allow the operator to direct the camera without touching the camera.

DETAILED DESCRIPTION OF THE PREFERRED EMBODIMENT

Figure 1:
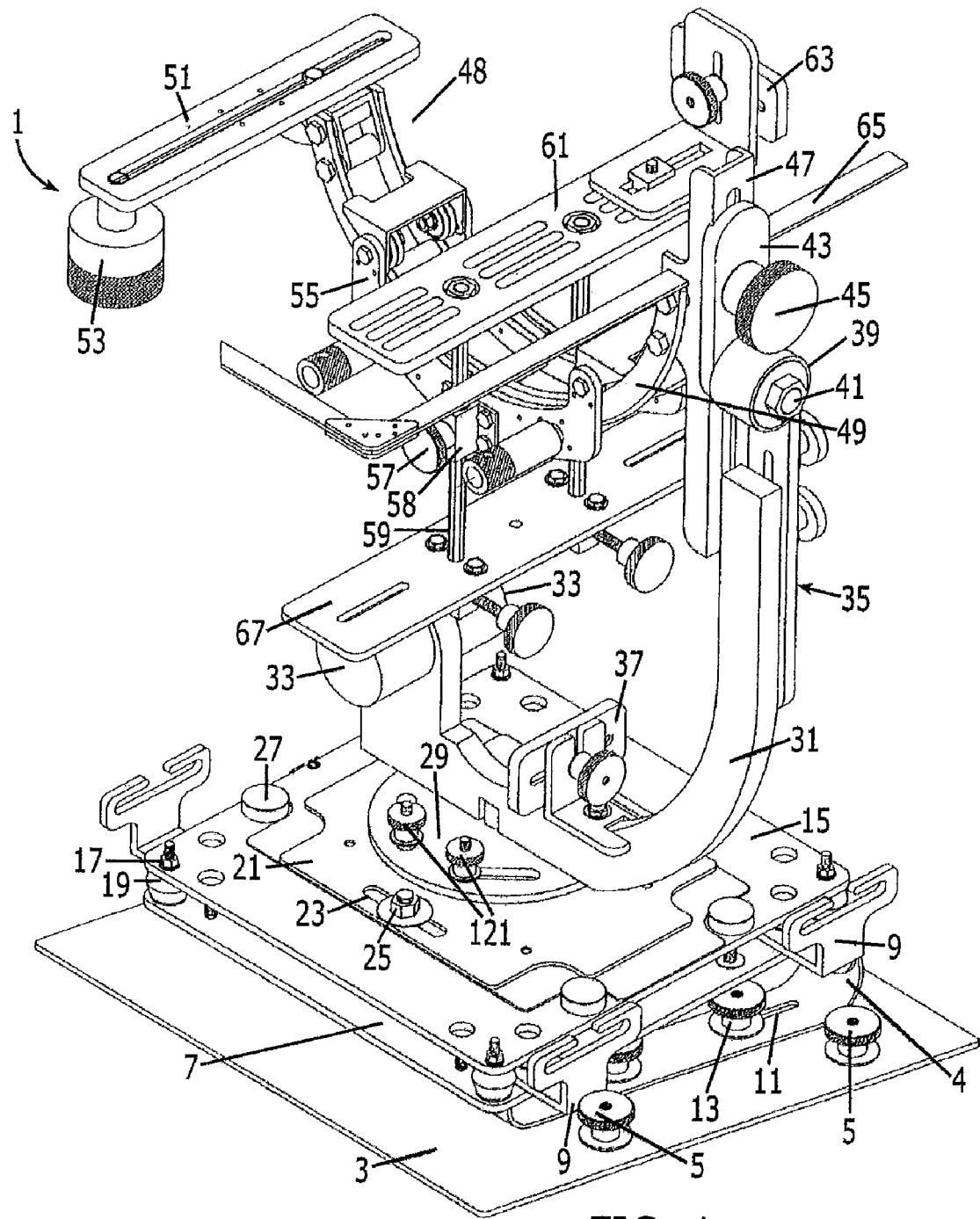
FIG. 1 is a front perspective view of the mount.

As shown in FIG. 1, the preferred embodiment of the mount 1 comprises a seat plate 3 to which are attached latch knobs 5 used to secure the seat plate 3 to the seat of a vehicle or aircraft enabled to accept the latching mechanism. The seat plate 3 supports the center plate 7 to which tie down brackets 9 are attached to enable the mount 1 to be attached to a seat using straps such as a seat belts. The position of the center plate 7 can be adjusted relative to the seat plate 3 by an arrangement of slots 11 and lock knobs 13. One end of the center plate 7 can also be elevated with respect to the seat plate 3 by an adjustable level support 4. The base plate 15 is attached to the center plate 7 by fasteners 17 which are attached to vibration isolators 19. The purpose of the vibration isolators 19 is to reduce vibration transmitted from the aircraft or vehicle to the base plate 15 and components resting on the base plate. The vibration isolators can be made of various material including silicone gel, rubber, plastic, springs, and combinations thereof. The vertical movement of the base plate 15 relative to the center plate 7 is limited by safety stops 27 which are firmly attached to the center plate 7 and pass loosely through openings in the base plate 7. The safety stops 27 function to keep the base plate 15 from separating from the center plate 7 because the vibration isolators 19 may not be strong enough to secure the base plate 15 to the center plate if overextended. A pan hub plate 21 rests upon the base plate 15 where it can be postionally adjusted by an arrangement of slots 23 and lock nuts 25. A pan stop plate 29 is connected to the pan hub plate 21 by a pan hub and bearing (not shown on FIG. 1) such that the pan stop plate 29 can swivel around a vertical axis. A yoke 31 with a J-configuration is attached to the pan stop plate 29. The yoke 31 has counterweights 33 mounted at one end and a height adjustment rail 35 at the other end. A pan gyro base plate 37 is attached to the yoke 31 to provide an attachment place for a gyrostabilizer (not shown in FIG. 1). A bearing assembly 39 is attached to the upper end of the height adjustment rail 35 to receive a spindle 41. The spindle 41 is attached to a first center-of-gravity adjustment rail 43 which in turn is adjustably attached to a second center-or-gravity rail 47 to which it can be secured by a lock knob 45. A carriage rail assembly 48 comprises a pair of curved carriage rails 49 that are attached at one end to slotted rail 47 such that the rails 49 are parallel to each other. The other end of the carriage rails 49 support a tilt gyro base 51 which in turn supports a tilt attitude adjustment weight 53. The tilt gyro base 51 provides an attachment place for a gyrostabilizer (not shown in FIG. 1). A carriage 55 rolls on top of the carriage rails 49. The carriage 55 has lock knobs 57 which fasten into sleeve blocks 58 to enable the adjustment of the position of the camera base support posts 59 which are attached to camera base plate 61. A roll gyro base plate 63 is attached to one end of the camera base plate to provide an attachment place for a gyrostabilizer (not shown in FIG. 1). A removable lens centering guide 65 can be inserted into slots in the rail 47 to be used to adjust the position of the camera base plate 61 such that the optical axis of a camera lens is centered with respect to the roll axis. A weight plate 67 may also be attached to the bottom ends of the camera base support posts 59 to provide for additional balance control for a camera (not shown) attached to the camera base plate 61.

Figure 2:
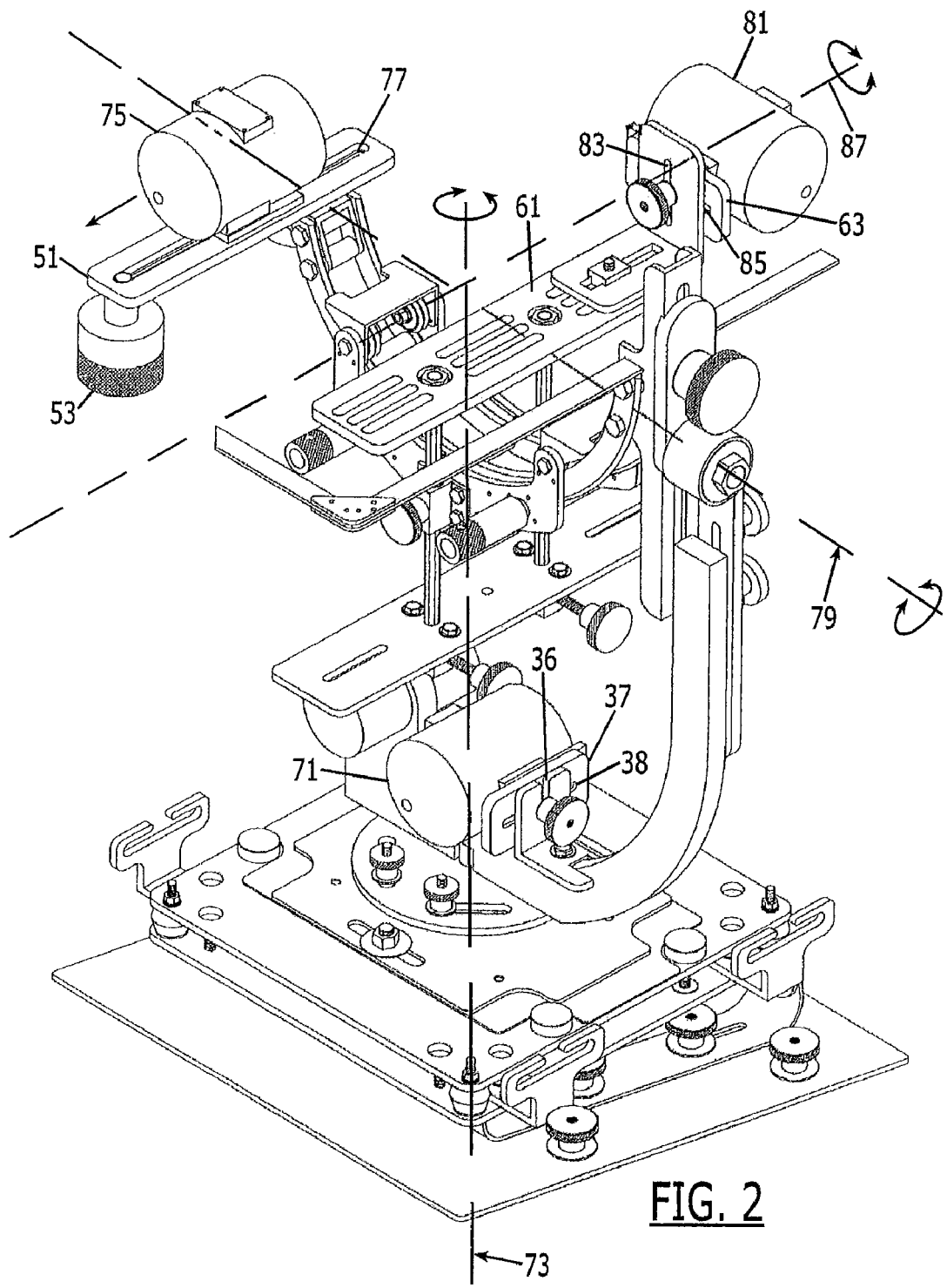
FIG. 2 is a front perspective view of the mount showing the gyrostabilizers and axes of rotation.

FIG. 2 shows the attachment of gyrostabilizers to the mount 1 and their respective axes of rotation. The pan gyrostabilizer 71 is attached to pan gyro base plate 37 which can be adjustably positioned with respect to vertical slot 36 and horizontal slot 38 so that the pan axis of rotation 73 passes through the centerline of the gyrostabilizer 71. The tilt gyro base 51 provides an attachment place for the tilt gyrostabilizer 75 such that it is centered on the tilt axis of rotation 79. The tilt attitude adjustment weight 53 can be selectively positioned along slot 77 to provide optimal balance for the camera (not shown) on the camera base plate 61. The roll gyrostabilizer 81 is attached to the roll gyro base plate 63 and adjusted within vertical slot 83 and horizontal slot 85 so that the roll axis of rotation 87 passes through the centerline of the gyrostabilizer 81. The gyrostabilizers 71, 75, and 81, act to resist movement about their respective axes of rotations and thus provide a stable platform on which the camera can be smoothly moved to capture images.

Figure 3:
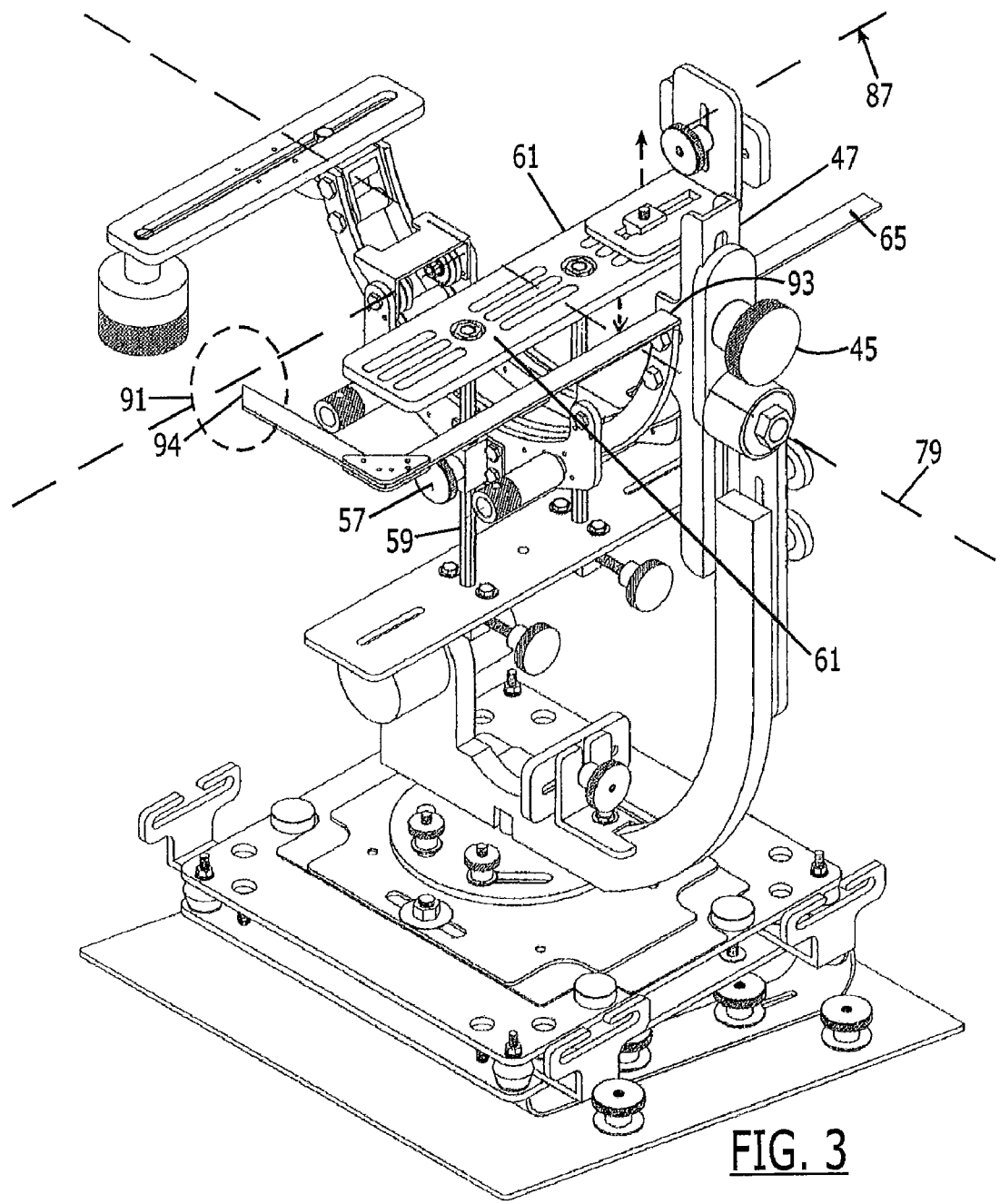
FIG. 3 is a front perspective view of the mount showing the use of the centering guide.

FIG. 3 shows how the optical axis of a camera lens 91 can be centered on the roll axis 87 of mount 1. After the camera (not shown) is mounted on the camera base plate 61, the A removable lens centering guide 65 is inserted into slots 93 in rail 47 such that the proximal end 94 of the centering guide 65 is positioned generally in front of lens 91. The position of the camera base plate 61 is then vertically adjusted by moving the camera base support posts 59 within the locking knob arrangement 57 such that the proximal end 94 is even with the center height of the camera lens 91. The support posts 59 are then secured by tightening the locking knob arrangement 57. It should be noted that while the preferred embodiment of the invention uses the arrangement of the support posts 59 and locking knob arrangement 57 as the means to align the optical axis of the camera with the roll axis 87, other means could be used as well such as a rack and pinion, threaded posts, spacers on studs, mechanical or hydraulic jacks, slotted plates, and the like. Further adjustment of the position of the center of gravity of the camera can be made by loosening lock knob 45 and positioning the second center-of-gravity adjustment rail 47 until a suitable balance of the camera is obtained, at which point the rail 47 is secured in place by tightening the lock knob 45.

Figure 4:
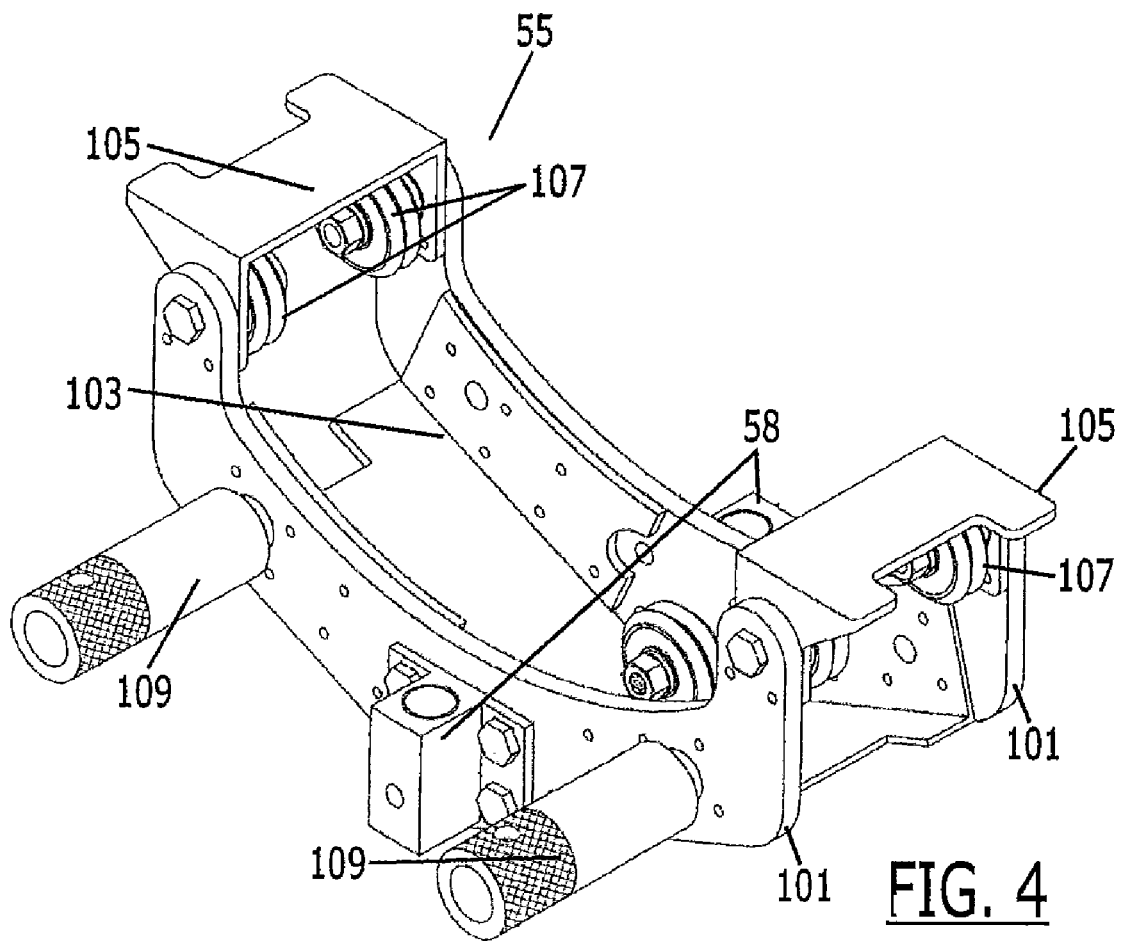
FIG. 4 is a perspective of the carriage.

FIG. 4 shows the carriage 55. Two side plates 101 are held in parallel by a channel piece 103 attached in the central portions and by roller guards 105 attached at both ends. The side plates 101 support six rollers. Sleeve blocks 58 are attached to the outer faces of the side plates 101 to support the camera base support posts 59 shown in FIGS. 1, 2 & 3. Grips 109 may be attached to a side plate 101 to enable the photographer or videographer to control the position of the camera.

Figure 5:
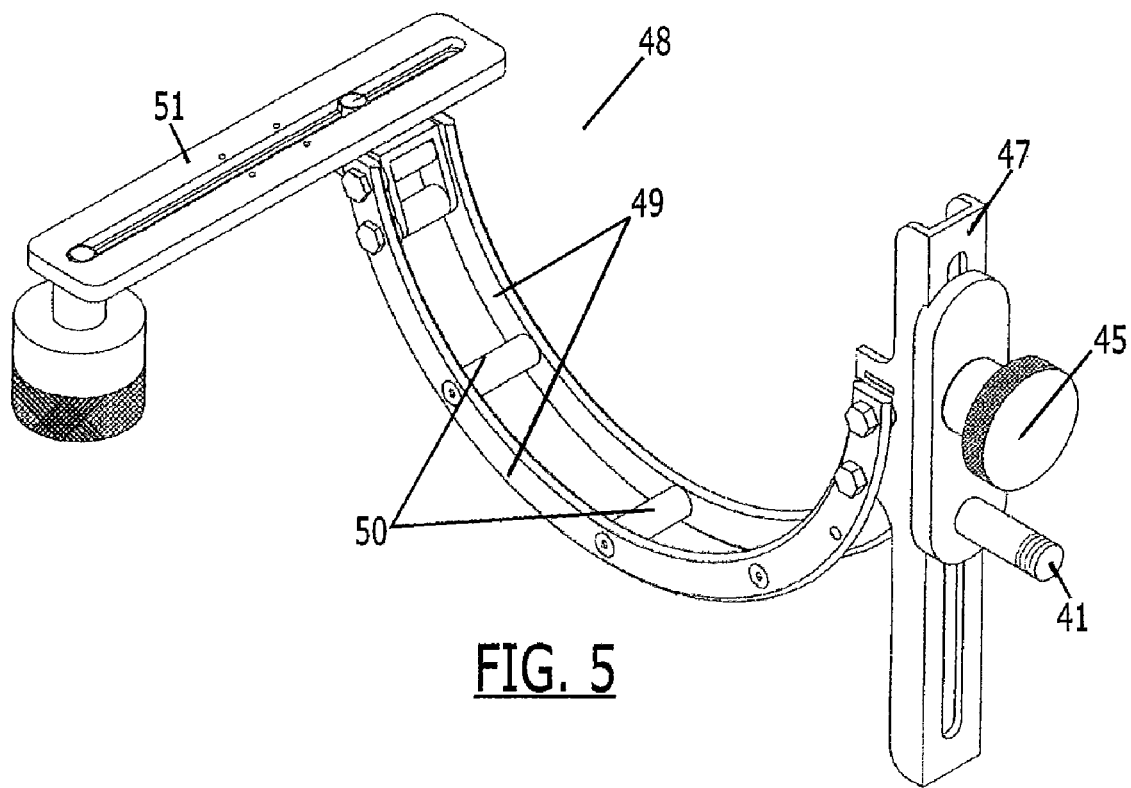
FIG. 5 is a perspective view of the carriage rail assembly.

FIG. 5 shows the carriage rail assembly 48. The carriage rails 49 are separated in a parallel arrangement by rail spacers 50. One set of ends of the rails 49 are attached to the tilt gyro base 51. The other set of ends of the rails 49 are attached to the second center-or-gravity rail 47. The first center-of-gravity adjustment rail 43 is adjustably attached to the second center-of-gravity rail 47 by lock knob 45. The spindle 41 is attached to the first center-of-gravity adjustment rail 43.

Figure 6A:
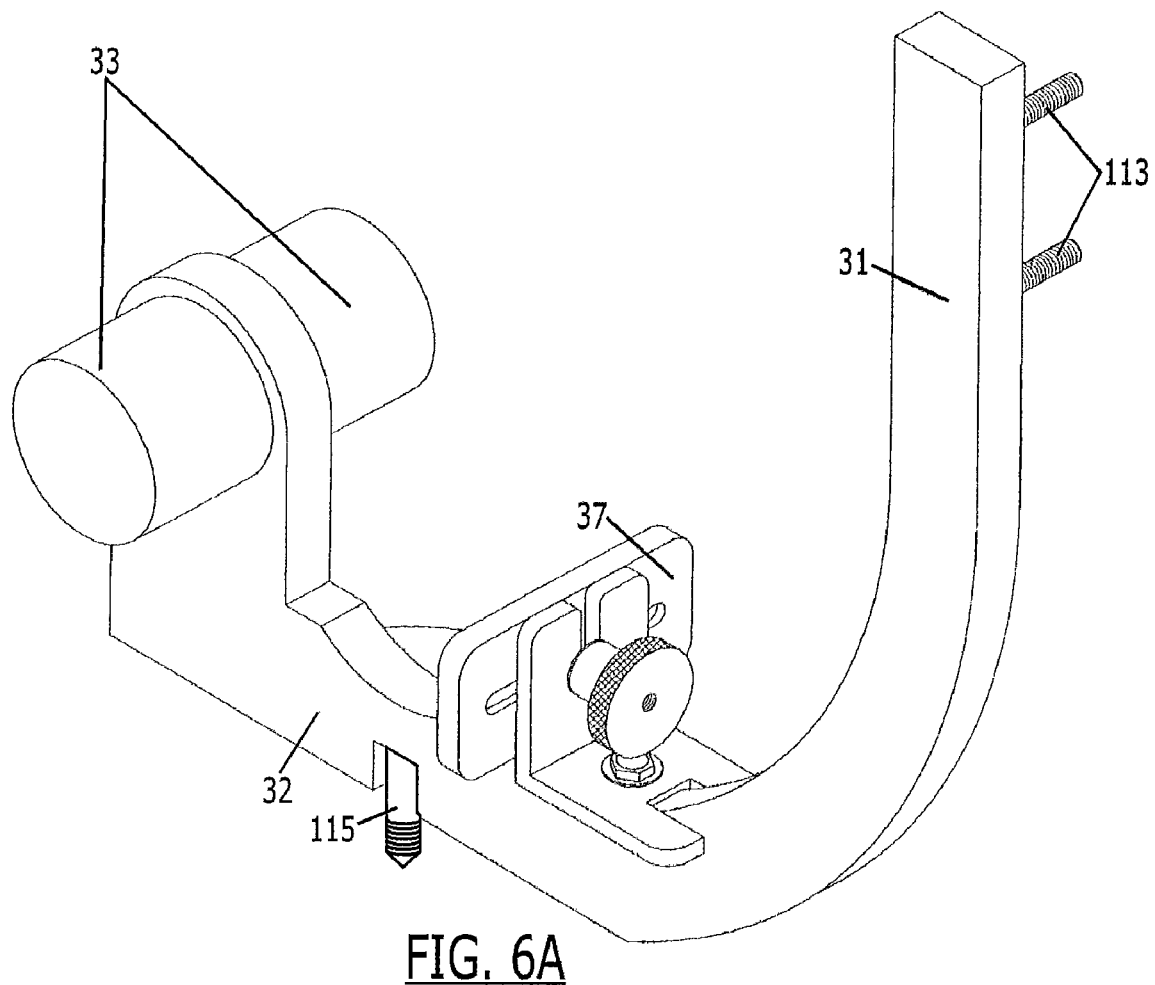
FIG. 6A is a perspective view of the yoke and associated components.
Figure 6B:
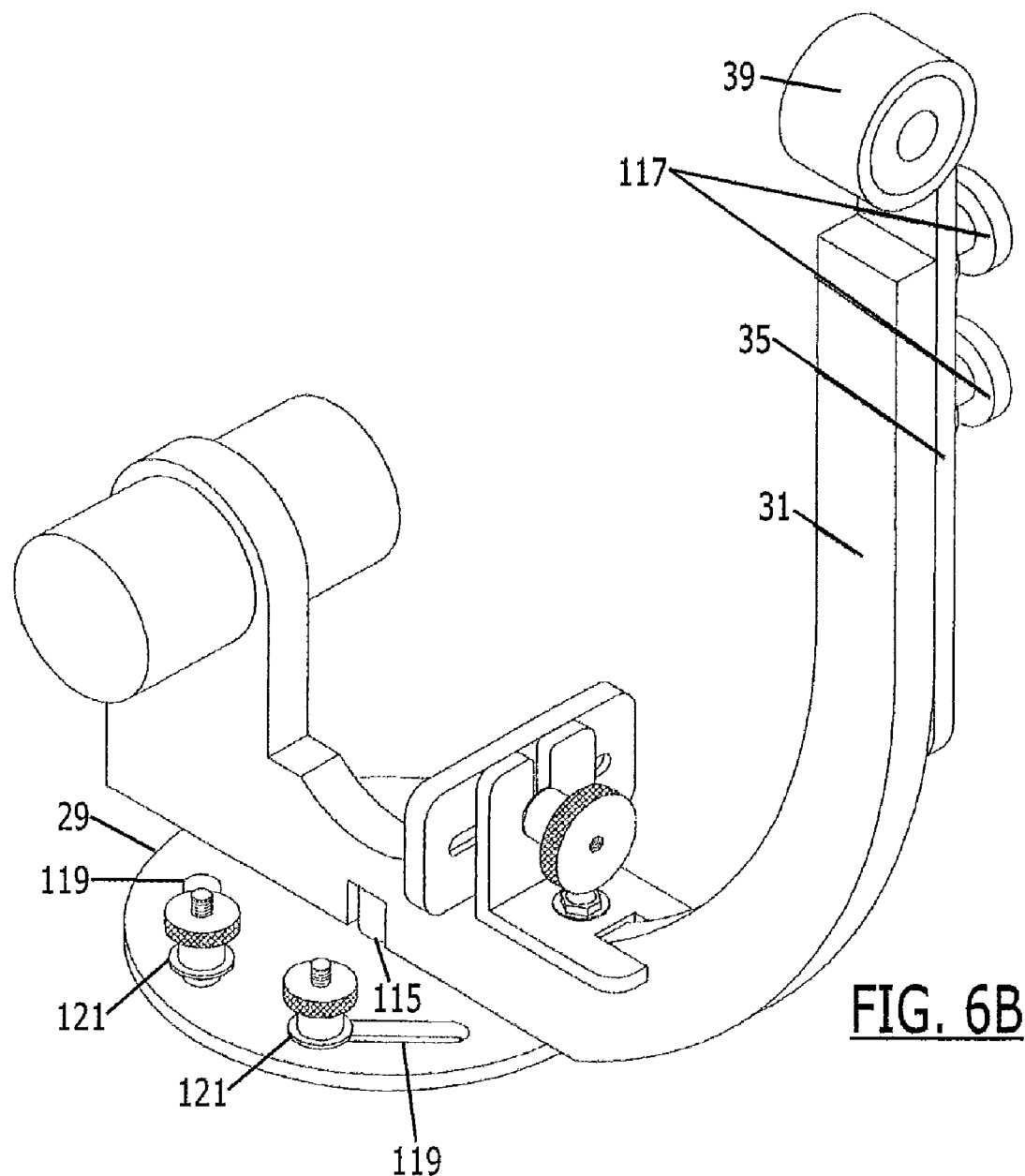
FIG. 6B is a perspective view of the yoke and pan stop plate.

FIG. 6A shows the yoke 31 and associated components. A stud 115 is attached at the bottom of the base portion 32 of the yoke 31. The pan gyro base 37 is fitted to the top of the base portion 32. The yoke is fitted with counterweights 33 that serve to balance the mount 1 with respect to the components that are supported by the other end of the yoke 31. A pair of studs 113 are attached to the yoke. FIG. 6B shows the yoke 31 attached to the pan stop plate 29. The pan stop base has two slots 119 into which pan stop knobs 121 may be adjustably positioned. The height adjustment rail 35 has a slot (not visible in figure) that fits over the pair of studs 113 and is secured to the yoke 31 by height adjustment knobs 117. Bearing assembly 39 is attached to the upper end of the height adjustment rail 35 to receive spindle 41 shown in FIG. 5.

Figure 7:
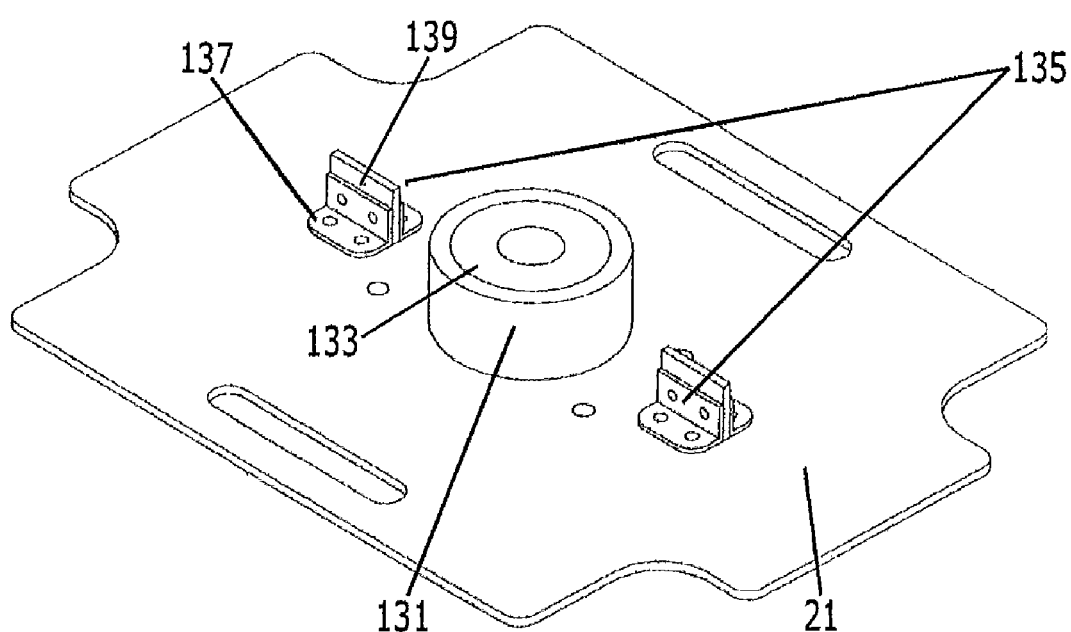
FIG. 7 is a perspective view of the pan hub plate.

FIG. 7 shows the pan hub plate 21. A pan hub 131 seating a bearing 133 is integrally attached to the center of the pan hub plate 21. On either side of the pan hub are pan stops 135 comprising brackets 137 in which a stop flap 139 is seated. The purpose of the pan stops 135 are to engage the bottom ends of the pan stop knobs 121 shown in FIG. 6B so as to indicate to the camera operator that the preselected limits of the panning range have been reached. In the preferred embodiment, the stop flaps 139 are made of a flexible material such as rubber so that an operator may force the pan stop knobs 121 past the pan stops 135 if it is desired to override the preselected panning range.

Figure 8A:
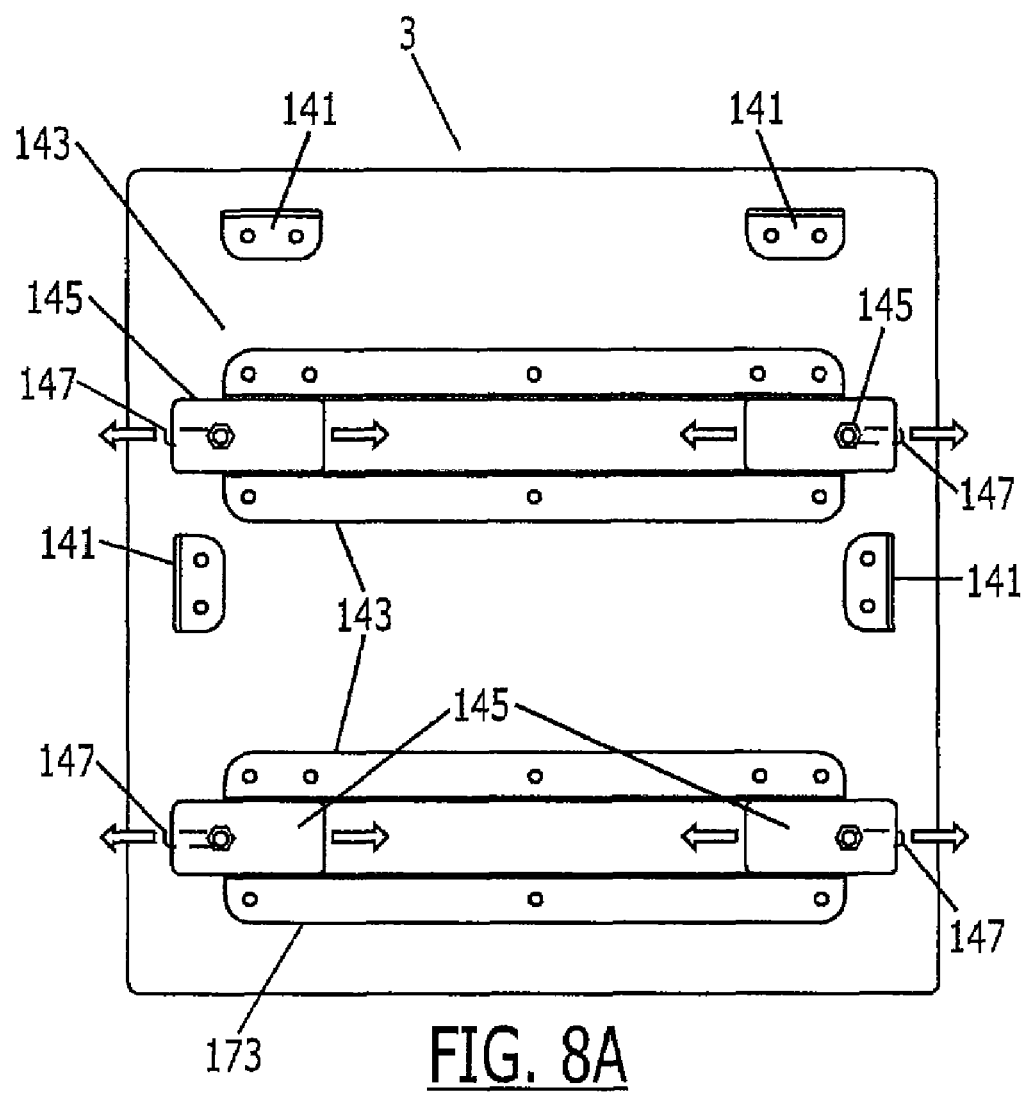
FIG. 8A is a bottom view of the seat plate.
Figure 8B:
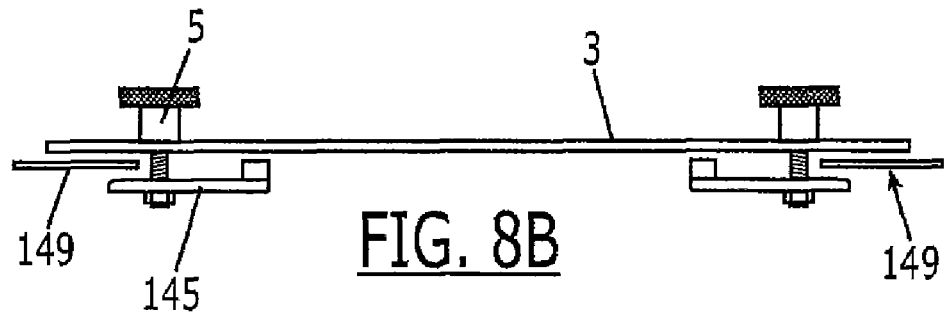
FIG. 8B is a side sectional view of the seat plate.

FIGS. 8A and 8B show a bottom view and side sectional view of the seat plate respectively. Seat stops 141 can be installed on the bottom of the seat plate 21 to assist in portioning the seat plate onto a seat box of an aircraft or vehicle. Latch slide guides 143 are attached to the seat plate 21 so as to restrict the movement of the seat latches 145 to a fore-and-aft direction. Slots 147 enable the seat latches to be selectably positioned and secured by latch knobs 5. When used with seat boxes that comprise a seat box lip 149, the seat latches 145 can be positioned to engage the seat box lip to secure the mount 1 to the seat box and can conversely be repositioned to disengage the seat box lip to enable the mount 1 to be removed from the seat box.

As shown in FIG. 2, it is generally intended that the gyrostabilizers 71, 75, and 81 be attached to their respective bases 37, 51, and 63, by means of screws that attach to threaded recesses in the gyrostabilizers. The gyro bases 37, 52, and 63, have respective slots 38, 77, and 85, which receive a bolt from the gyrostabilizer side which passes through respective slots 36 and 83 and are then secured by thumb nuts. Other means, not preferred, of securing the gyrostabilizers to mount 1 include welds, studs, adhesives, magnets, straps and the like.

Setting up the mount for operation is described as follows with reference to FIGS. 1, 2, and 3. The camera is attached to the camera base plate 61 which is thereafter adjusted so that the optical axis of the lens 91 is centered into alignment with the roll axis 87 of the mount. This adjustment can be facilitated by a removable centering guide 65 that is temporarily placed into a slot 93 on the second center-of-gravity rail 47. The gyrostabilizers 71, 75, and 81 are likewise attached to their respective base plates 37, 51, and 63 and adjusted into position so that they are properly centered and aligned with the appropriate axis of rotation. Adjustments to achieve balance through the tilt axis 79 can be made by adjusting the position of the tilt attitude adjustment weight 53 within slot 77 on the tilt gyro base 51. An optional weight plate 67 can be attached to the bottom portions of the support posts 59 to provide attachment points for weights which can be positioned to effect other adjustments to the balance around the tilt and roll axes 79 and 87. The center of gravity around the tilt axis 79 can also be adjusted by positioning the second center-of-gravity rail 47 with respect to the first center-of-gravity rail 43 and securing them into position by tightening the lock knob 45. Another adjustment with respect to the total height of the camera above the seat plate 3 can be made by positioning rail 35 relative to the yoke 31 and securing it to the yoke by tightening one or more lock knobs. A lateral adjustment of the pan hub plate 21 relative to the base plate 15 can be made by positioning them and then securing the locknuts 25 within the slots 23.

The seat base 3 may be attached to the seat box lip 149 of an aircraft with latches 145 as shown in FIG. 8B. Other modes of attachment, such with straps, clamps, and bolts can also be used to removably secure the mount to an aircraft, vehicle, or watercraft. Tie down brackets 9 are shown in FIG. 1 that can be used to attach mount 1 to a seat using straps such as a seat belts. Once the mount 1 is attached, the range of rotation around the pan axis 73 may be set to selected limits by positioning and securing the pan stops 121 shown on FIG. 6B such that bottom of the pan stop knobs 121 will make contact with the stop flaps 139 shown in FIG. 7 when the yoke 31 is rotated to the limit of the pre-set range of rotation. If desired, the operator may rotate the yoke 31 past the limit of the pre-set range of rotation by exerting sufficient force to overcome the resistance of the stop flap 139 thus causing the bottom end of the pan stop knob 121 to move past the stop flap 139.

To operate the mount, the gyrostabilizers 71, 75, and 81 are activated and allowed to reach their operating rate of rotation. The gyrostabilizers 71, 75, and 81 exert a stabilizing effect along each axis of rotation 73, 79, and 87, and thus tend to restrain the camera from being jostled or incurring other inadvertent motion. The camera operator can direct the position of the camera by smoothly moving and aiming the camera with respect to a desired position. To facilitate control over the camera, the carriage 55 is fitted with grips 109 which the camera operator may hold and thus direct the position of the camera without touching the camera itself. In addition, the grips 109 can be fitted with accessories such as pistol grip control handles (not shown) to aid in holding. Such control handles can provide means to facilitate operation of the camera such as a trigger which controls a signal that activates and deactivates the recording mode of a video camera.

It will be apparent to those skilled in the art that various modifications and variations can be made to the present invention without departing from its scope and spirit. Thus, it is intended that the present invention covers the modifications and variations that come within the scope of the claims and their equivalents.

I claim:

1. An apparatus for stabilizing a camera, the apparatus comprising:
    a carriage and carriage rail assembly, said carriage resting upon said carriage rail assembly and rotatable about a first axis of rotation defined by said carriage rail assembly;
    a camera support plate attached to said carriage;
    a yoke to which said carriage rail assembly is attached by a first pivotable bearing, such that said carriage rail assembly rotates about a second axis of rotation that is perpendicular to said first axis of rotation;
    a hub to which said yoke is attached by a second pivotable bearing, such that said yoke rotates about a third axis of rotation that is perpendicular to said first and second axes of rotation; and
    further comprising seat latches for selectively attaching to and detaching said apparatus from a seat box.

2. An apparatus for stabilizing a camera, the apparatus comprising:
    a carriage and carriage rail assembly, said carriage resting upon said carriage rail assembly and rotatable about a first axis of rotation defined by said carriage rail assembly;
    a camera support plate attached to said carriage;
    a yoke to which said carriage rail assembly is attached by a first pivotable bearing, such that said carriage rail assembly rotates about a second axis of rotation that is perpendicular to said first axis of rotation;
    a hub to which said yoke is attached by a second pivotable bearing, such that said yoke rotates about a third axis of rotation that is perpendicular to said first and second axes of rotation; and
    further comprising an alignment device for use in aligning the first axis with the optical axis of a lens, said alignment device comprising an angled bar with a first end and a second end, of which said first end can be engaged into the apparatus such that said second end indicates a point on said first axis of rotation.

3. An apparatus for stabilizing a camera, the apparatus comprising:
    a carriage and carriage rail assembly, said carriage resting upon said carriage rail assembly and rotatable about a first axis of rotation defined by said carriage rail assembly;
    a camera support plate attached to said carriage;
    a yoke to which said carriage rail assembly is attached by a first pivotable bearing, such that said carriage rail assembly rotates about a second axis of rotation that is perpendicular to said first axis of rotation;
    a hub to which said yoke is attached by a second pivotable bearing, such that said yoke rotates about a third axis of rotation that is perpendicular to said first and second axes of rotation;
    wherein the yoke is of a J-configuration and is fitted with a counterweight on the portion opposite of the portion attached to said first pivotable bearing.

4. An apparatus for stabilizing a camera with gyrostabilizers, the apparatus comprising:
    a carriage resting upon a carriage rail assembly, with said carriage rotatable about a first axis of rotation defined by said carriage rail assembly and said carriage rail assembly having means to attach a gyrostabilizer;

a camera support plate attached to said carriage, said camera support plate having means to attach a gyrostabilizer and said camera, a yoke to which said carriage rail assembly is attached by a first pivotable bearing, such that said carriage rail assembly rotates about a second axis of rotation that is perpendicular to said first axis of rotation; and a hub to which said yoke is attached by a second pivotable bearing, such that said yoke rotates about a third axis of rotation that is perpendicular to said first and second axes of rotation;

and means to attach a gyrostabilizer to said yoke.

5. The apparatus of claim 4 further comprising a first supporting base and a second supporting base, separated by vibration isolators.

6. The apparatus of claim 4, further comprising adjustable pan stops capable of being selectively positioned to indicate the preselected limits of the range of rotation about the third axis of rotation.

7. The apparatus of claim 4 in which said camera support plate has adjustment means by which to position the optical axis of said camera with respect to the first axis of rotation.

8. The apparatus of claim 4 further comprising seat latches for selectively attaching to and detaching said apparatus from a seat box.

9. The apparatus of claim 4 further comprising an alignment device for use in aligning the first axis with the optical axis of a lens, said alignment device comprising an angled bar with a first end and a second end, of which said first end can be engaged into the apparatus such that said second end indicates a point on said first axis of rotation.

10. The apparatus of claim 4 further comprising positionable weights for balancing said carriage and carriage rail assembly along the second axis of rotation.

11. The apparatus of claim 4 wherein the yoke is of a J-configuration and is fitted with a counterweight on the portion opposite from the portion attached to said first pivotable bearing.

12. The apparatus of claim 4 wherein the yoke is of a J-configuration and is fitted with a counterweight on the portion opposite from the portion attached to said first pivotable bearing and further comprising:

a first supporting base and a second supporting base, separated by vibration isolators;

adjustable pan stops capable of being selectively positioned to indicate the preselected limits of the range of rotation about the third axis of rotation;

an adjustment means for said camera support plate by which to position the optical axis of said camera with respect to the first axis of rotation;

seat latches for selectively attaching to and detaching said apparatus from a seat box;

an alignment device for use in aligning the first axis with the optical axis of a lens, said alignment device comprising an angled bar with a first end and a second end, of which said first end can be engaged into the apparatus such that said second end indicates a point on said first axis of rotation; and positionable weights for balancing said carriage and carriage rail assembly along the second axis of rotation.

* * * * *